(12) United States Patent
Chen et al.

(10) Patent No.: US 11,463,257 B2
(45) Date of Patent: Oct. 4, 2022

(54) BIOMETRIC SENSOR ON PORTABLE DEVICE

(71) Applicant: Visa International Service Association, San Francisco, CA (US)

(72) Inventors: Yuexi Chen, Foster City, CA (US); Garth Petersen, Belmont, CA (US)

(73) Assignee: Visa International Service Association, San Francisco, CA (US)

(*) Notice: Subject to any disclaimer, the term of this patent is extended or adjusted under 35 U.S.C. 154(b) by 54 days.

(21) Appl. No.: 16/761,648

(22) PCT Filed: Nov. 6, 2017

(86) PCT No.: PCT/US2017/060226
§ 371 (c)(1),
(2) Date: May 5, 2020

(87) PCT Pub. No.: WO2019/089060
PCT Pub. Date: May 9, 2019

(65) Prior Publication Data
US 2021/0184857 A1    Jun. 17, 2021

(51) Int. Cl.
*H04L 9/32* (2006.01)
*H04L 9/40* (2022.01)

(52) U.S. Cl.
CPC .......... *H04L 9/3231* (2013.01); *H04L 9/3234* (2013.01); *H04L 9/3239* (2013.01); *H04L 9/3247* (2013.01); *H04L 63/0853* (2013.01); *H04L 63/0861* (2013.01); *H04L 63/126* (2013.01); *H04L 2463/121* (2013.01)

(58) Field of Classification Search
CPC ... H04L 9/3231; H04L 9/3234; H04L 9/3239; H04L 9/3247; H04L 63/0853; H04L 63/0861; H04L 63/126; H04L 2463/121; H04L 2209/56; G06F 21/32
See application file for complete search history.

(56) References Cited

U.S. PATENT DOCUMENTS

| | | | |
|---|---|---|---|
| 8,636,205 B2 | 1/2014 | Hammad | |
| 9,038,886 B2 | 5/2015 | Hammad | |
| 9,043,245 B2 | 5/2015 | Mehta et al. | |
| 9,065,643 B2 | 6/2015 | Hurry et al. | |
| 9,330,386 B2 | 5/2016 | Hill et al. | |

(Continued)

FOREIGN PATENT DOCUMENTS

| | | | |
|---|---|---|---|
| CN | 105959287 | 9/2016 | |
| CN | 105959287 A | * 9/2016 | ............. G06Q 20/38 |

(Continued)

OTHER PUBLICATIONS

English Translation of CN105959287A (Year: 2016).*
(Continued)

*Primary Examiner* — Daniel B Potratz
(74) *Attorney, Agent, or Firm* — Kilpatrick Townsend & Stockton LLP

(57) ABSTRACT

A method and system for secure remote digital interactions through the use of biometric templates is disclosed. In one example, the method includes an interaction that prompts the use of obtaining a first biometric template and comparing it to a second biometric template to determine if they match. The match process is performed on a portable device.

16 Claims, 4 Drawing Sheets

(56) References Cited

U.S. PATENT DOCUMENTS

| | | |
|---|---|---|
| 9,922,322 B2 | 3/2018 | Flurscheim et al. |
| 10,366,391 B2 | 7/2019 | Dimmick |
| 2005/0240778 A1* | 10/2005 | Saito .............. G06K 19/07354 713/186 |
| 2010/0131414 A1* | 5/2010 | Tame .................. G06Q 20/327 340/5.82 |
| 2015/0237046 A1 | 8/2015 | Chang et al. |
| 2015/0324736 A1 | 11/2015 | Sheets et al. |
| 2015/0379250 A1 | 12/2015 | Saito et al. |
| 2016/0110721 A1* | 4/2016 | Russell ............. G06Q 30/0609 726/7 |
| 2016/0267261 A1 | 9/2016 | Tooley, II |
| 2016/0269403 A1 | 9/2016 | Koutenaei et al. |
| 2017/0126672 A1 | 5/2017 | Jang |
| 2018/0006821 A1 | 1/2018 | Kinagi |
| 2019/0139051 A1* | 5/2019 | Kopf .................. G06Q 20/204 |

FOREIGN PATENT DOCUMENTS

| | | | |
|---|---|---|---|
| KR | 20150097059 | 8/2015 | |
| WO | WO-2017019972 A1 * | 2/2017 | ............ G06F 21/32 |
| WO | 2017197974 | 11/2017 | |

OTHER PUBLICATIONS

EP17930626.1 , "Extended European Search Report", dated Oct. 20, 2020, 8 pages.

PCT/US2017/060226, "International Search Report and Written Opinion", dated Aug. 7, 2018, 12 pages.

SG11202004111R , "Written Opinion", dated Nov. 11, 2021, 7 pages.

Application No. 17930626.1, "EP Office Action", dated Jul. 8, 2022, 7 pages.

* cited by examiner

BIOMETRIC SENSOR ON PORTABLE DEVICE

This application is a U.S. National Phase of PCT Application No. PCT/US2017/060226, filed Nov. 6, 2017, the disclosure of which is incorporated by reference.

BACKGROUND

A number of conventional systems and methods for biometric authentication exist.

In some instances, a reference biometric template for a user may be stored at a remote server computer. Once the user initiates an interaction, a local device may receive a user biometric sample. The local device may then convert the biometric sample into a biometric template. The biometric template is then transmitted to the remote server computer. The remote server computer may determine if the received biometric template matches a previously stored reference biometric template. If the biometric templates match, then the user may be authenticated, and then allowed to continue in the interaction.

There are a number of problems with storing the reference biometric template in a remote server computer. First, a biometric template needs to be transmitted to the remote server computer over a communications network. This makes the biometric template susceptible to man-in-the-middle attacks. Another problem is that the remote server computer could be hacked at some point. If this occurs, then every stored reference biometric template would become compromised.

In other instances, after initiating an interaction, a device may allow a user to verify a biometric template, formed from a biometric sample provided by the user, against a reference biometric template stored on the device. The device may compare the two biometric templates to determine whether they match. Then, the device will transmit a successful "yes match" or "no match" to a connected device. The connected device then determines whether or not to continue the interaction.

There are a number of problems with the device only determining if the two biometric templates match. The connected device only receives a "yes match" or a "no match" result. A hacker could fake a "yes match" result, thereby directly gaining access to the interaction. Another problem with this is that, if the biometric templates have been previously compromised to a hacker, then the hacker may perform any interaction in the name of the user of the device by using the compromised biometric template. Since a user cannot change their biometrics, the hacker may problematically have access to the user's identity for an extended period of time.

Embodiments of the invention address these and other problems, individually and collectively.

BRIEF SUMMARY

Embodiments of the invention are directed to methods and systems for performing secure remote digital interactions through the use of biometric templates.

One embodiment of the invention is directed to a method. The method comprises: establishing, a first communication between a user device and a resource provider computer operating a host site in an interaction between the host site and a user of the user device; establishing, a second communication between the user device and a portable device; capturing, by the portable device, a biometric sample of the user; converting, by the portable device, the biometric sample into a first biometric template; comparing, by the portable device, the first biometric template with a second biometric template stored on the portable device, and determining a match result; receiving, by the portable device from the resource provider computer, via the user device, interaction data; generating, by the portable device, a cryptogram by encrypting at least the interaction data and the match result, or a derivative thereof, with an encryption key; and transmitting, by the portable device, the cryptogram and access data stored on the portable device, to the resource provider computer via the user device, wherein a remote server computer in communication with the resource provider computer verifies the cryptogram, analyzes the match result, and allows the interaction to proceed using the access data based upon the verification of the cryptogram and the match result.

Another embodiment of the invention is directed to a portable device. The portable device is capable of being coupled to a user device. The user device is capable of establishing a first communication between the user device and a resource provider computer operating a host site in an interaction between the host site and a user of the user device. The portable device comprises: a processor, a memory, and a computer readable medium. The computer readable medium comprises code, executable by the processor, to implement a method comprising: establishing, a second communication between the user device and the portable device; capturing, a biometric sample of a user; converting, the biometric sample into a first biometric template; comparing, the first biometric template with a second biometric template stored on the portable device, and determining a match result; receiving from the resource provider computer, via the user device, interaction data; generating, a cryptogram by encrypting at least the interaction data and the match result, or a derivative thereof, with an encryption key; and transmitting, the cryptogram and access data stored on the portable device, to the resource provider computer via the user device. A remote server computer in communication with the resource provider computer verifies the cryptogram, analyzes the match result, and allows the interaction to proceed using the access data based upon the verification of the cryptogram and the match result.

Another embodiment of the invention is directed to a method comprising: establishing, a first communication between a user device and a resource provider computer operating a host site in an interaction between the host site and a user of the user device; and receiving, by the resource provider computer, a cryptogram and access data from the user device. The user device received the cryptogram, which encodes a biometric match result and interaction data, or a derivative thereof, and the access data from a portable device. A remote server computer in communication with the resource provider computer verifies the cryptogram and the access data, and allows the interaction to proceed if the cryptogram and the access data are verified.

These and other embodiments of the invention are described in further detail below.

DETAILED DESCRIPTION

Figure 1:
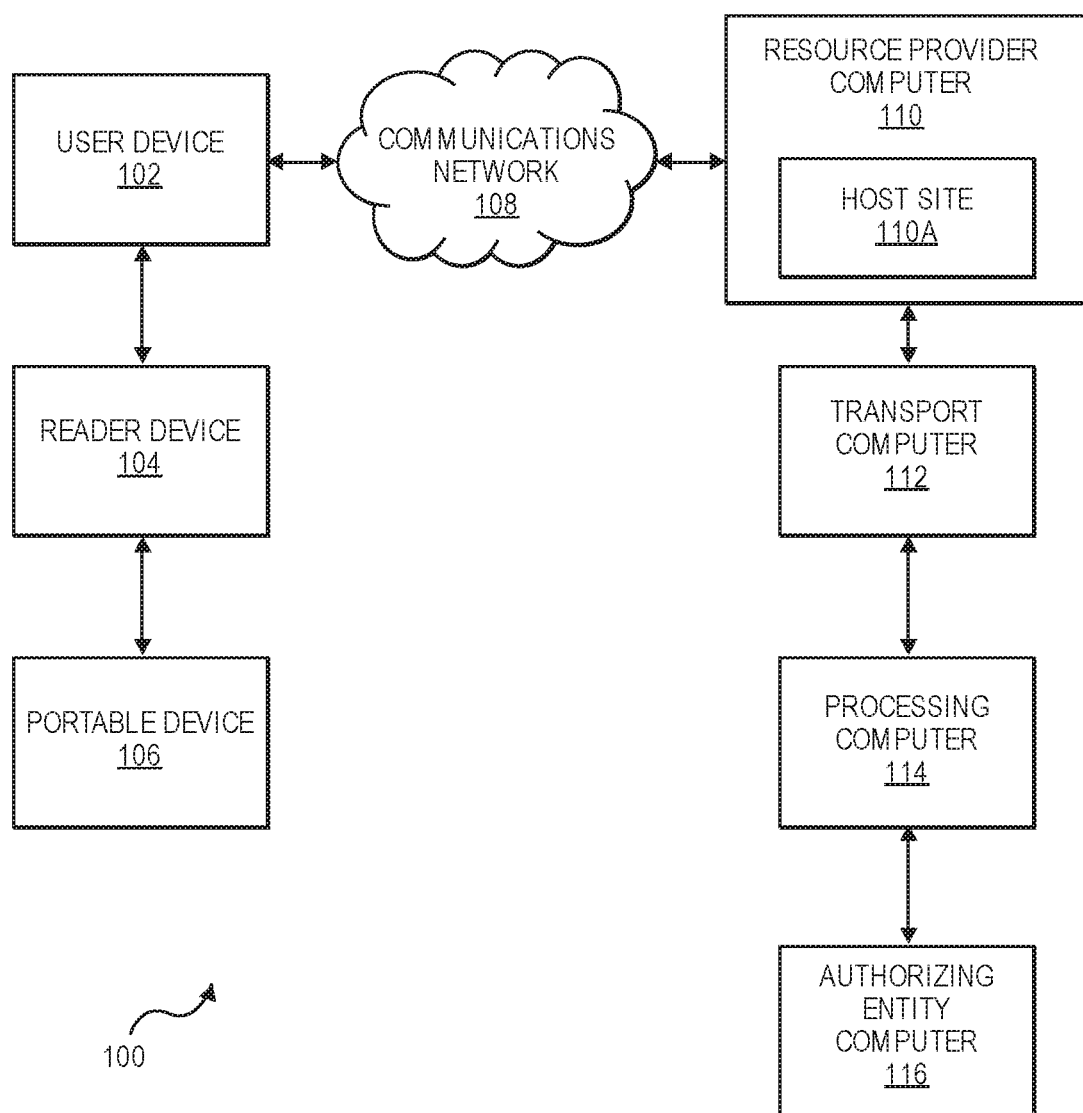
FIG. 1 shows a block diagram of a system according to an embodiment of the invention. The system illustrated in FIG. 1 can be used to conduct a payment transaction.

Prior to discussing the details of some embodiments of the present invention, a description of some terms may be helpful in understanding the various embodiments.

A "user" can be a person that uses something (e.g., a computer) for a particular purpose. In some embodiments, a user may include an individual that may be associated with one or more personal accounts and/or mobile devices. The user may also be a cardholder, an account holder, or a consumer in some embodiments.

A "user device" may be any suitable device that is operated by a user. Suitable user devices can communicate with external entities such as portable devices and remote server computers. Examples of user devices include mobile phones, laptop computers, desktop computers, server computers, vehicles such as automobiles, household appliances, wearable devices such as smart watches and fitness bands, etc.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers.

A "remote server computer" can be a server computer that is remotely located with respect to a client computer. Examples of remote server computers may include transport computers, processing computers, authorizing entity computers, resource provider computers, any computers that provide support for any of the previously described computers, etc. A remote server computer may also be implemented as a cloud based computer system.

A "portable device" can be a device that is easily transportable. In some cases, it can be hand-held and compact. For example, a portable device may fit into a user's wallet and/or pocket (e.g., pocket-sized). Some exemplary portable devices may include smart cards, ordinary credit or debit cards (with a magnetic strip), keychain devices, etc. Other examples of portable devices include cellular phones, personal digital assistants (PDAs), pagers, payment cards, security cards, access cards, smart media, transponders, vehicles (e.g., cars, boats, motorcycles, etc.), wearable devices (e.g., smart watch, smart jewelry, smart clothing, etc.) and the like. The portable devices can also be debit devices (e.g., a debit card), credit devices (e.g., a credit card), or stored value devices (e.g., a stored value card).

A memory in a portable device may store any suitable information. Suitable information may include access data such as financial information, which may include information such as bank account information, bank identification number (BIN), credit or debit card account number information (PAN), expiration dates, consumer information such as name, date of birth, etc. Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "issuer" may typically refer to a business entity (e.g., a bank) that maintains an account for a user. An issuer may also issue payment credentials stored on a user device, such as a cellular telephone, smart card, tablet, or laptop to the consumer.

A "resource provider" may be an entity that can provide a resource such as a good, service, data, etc. to a requesting entity. Examples of resource providers may include merchants, governmental entities that can provide access to data, data warehouses, entities that can provide access to restricted locations (e.g., train station operators), etc. In some embodiments, resource providers may be associated with one or more physical locations (e.g., supermarkets, malls, stores, etc.) and online platforms (e.g., e-commerce websites, online companies, etc.). In some embodiments, resource providers may make physical items (e.g., goods, products, etc.) available to the user. In other embodiments, resource providers may make digital resources (e.g., electronic documents, electronic files, etc.) available to the user. In other embodiments, resource providers may manage access to certain services or data (e.g., a digital wallet provider).

An "interaction" can be a reciprocal action, effect, or influence. An interaction, for example, could be an exchange or transaction between two or more parties. Examples of transactions can include payment transactions, data access transactions, and location access transactions.

An "application program interface" or "API" may include software specifying how components of a system should interact. The API may comprise a set of routines, protocols, and tools on which software applications may be built. An API may be used for a web-based system, operating system, database system, computer hardware or software library, and may include specifications for routines, data structures, object classes, variables and/or remote calls.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "digital signature" may include a type of electronic signature that encrypts documents with digital codes that are particularly difficult to duplicate. A digital signature may include data used to provide assurance or evidence as to the origin and identity of an electronic record or message. Digital signatures can be based on public key cryptography (i.e. asymmetric cryptography). Digital signatures may be generated using a public key algorithm such as Rivest-Shamir-Adleman cryptosystem (RSA), or Elliptic Curve Cryptography (ECC). To create a digital signature, signing software may be used to create a one-way hash of electronic data that is to be signed by a signing entity. A private key of the signing entity is then used to encrypt the hash and form the digital signature. The public key may then be used to verify the digital signature. In other cases, a symmetric key of a symmetric key pair can be used to create a digital signature. A digital signature may be a form of a cryptogram in some embodiments.

The term "validation" may include the act of checking or affirming that information is legitimate. An example may be the act of checking that a digital signature appended to an electronic record is, in fact, legitimate and was signed by the entity that alleges creation of the digital signature. In some embodiments, digital signatures may be validated according to a verification algorithm in conjunction with a signing entity's public key. In other cases, if underlying data was signed using a symmetric key of a symmetric key pair, the signature can be validated with the corresponding symmetric key.

An "authorizing entity" is an entity which can authorize or approve interactions. In some embodiments, an authorizing entity may be a business entity (e.g., an issuer, or bank) that maintains an account for a user and is capable of authorizing interactions such as payment transactions for the purchase of goods or services.

An "authorization request message" may be an electronic message that requests authorization for an interaction such as a transaction. In some embodiments, it is sent to a transaction processing computer and/or an issuer of a payment card to request authorization for a transaction. An authorization request message, according to some embodiments, may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. point of sale equipment) that indicates approval of the transaction. The code may serve as proof of authorization.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of payment credentials may include a PAN (primary account number or "account number"), user name, expiration date, and verification values such as CVV, dCVV, CVV2, dCVV2, and CVC3 values.

"Access data" may include any suitable data that can be used to access a resource or create data that can access a resource. In some embodiments, "access data" may include credentials such as payment credentials. In some embodiments, access data may be account information for a payment account. Account information may include a PAN, payment token, expiration date, verification values (e.g., CVV, CVV2, dCVV, dCVV2), etc. In other embodiments, access data could include data that can be used to access a location. Such information may be ticket information for an event, data to access a building, transit ticket information, etc. In yet other embodiments, access data may be data that can be used to access secret or sensitive information.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "cryptogram" may include a piece of obscured text such as encrypted text. A cryptogram may be formed by encrypting input data or a derivative thereof such as hash value of input data, with an encryption key such as a symmetric encryption key. If a hash value is produced, a hashing algorithm such as SHA1 or SHA256 may be used. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Details of some embodiments of the present invention will now be described.

FIG. 1 shows a system 100 according to an embodiment of the invention. The system 100 comprises a user device 102 coupled to a reader device 104, which is in turn coupled to a portable device 106. In some embodiments, the reader device 104 may be part of the user device 102. The user device 102 can communicate with a resource provider computer 110 via a communications network 108. The resource provider computer may be in communication with an authorizing entity computer 116, via a transport computer 112 and a processing computer 114.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the computers, networks, and devices described in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like.

The communications network 108 may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The communications network 108 may use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The reader device 104 may be any device capable of reading data from a portable device 106. It may also be capable of operationally coupling the user device 102 and the portable device 106 such that they can communicate with each other. The reader device 104 can use a near field communication (NFC) mechanism, LAN connection, a universal serial bus (USB) device, or any other suitable coupling device or mechanism. In some embodiments, the reader device 104 may be a component on the user device 102.

The portable device 106 may include a processor, a memory, and a computer readable medium comprising code. The code may be executable by the processor to implement a method comprising: establishing, a second communication between the user device and the portable device; capturing, a biometric sample of the user; converting, the biometric sample into a first biometric template; comparing, the first biometric template with a second biometric template stored on the portable device, and determining a match result; receiving from the resource provider computer, via the user device, interaction data; generating, a cryptogram by encrypting at least the interaction data and the match result with an encryption key; and transmitting, the cryptogram and access data stored on the portable device, to the resource provider computer via the user device, wherein a remote server computer in communication with the resource provider computer verifies the cryptogram, analyzes the match result, and allows the interaction to proceed using the access data based upon the verification of the cryptogram and the match result.

The resource provider computer 110 may be associated with a resource providing entity. The resource provider computer 110 may be connected to the communications network 108 and the transport computer 112. In some embodiments, the resource provider computer 110 may be in communication with the authorizing entity computer 116.

The resource provider computer 110 may include a processor, a memory, and a computer readable medium coupled to the processor. The computer readable medium can comprise code, executable by the processor, for performing a method comprising: establishing, a communication between a user device and a resource provider computer operating a host site in an interaction between the host site and a user of the user device; and receiving, by the resource provider computer, a cryptogram and access data from the user device. The user device received the cryptogram encoding a biometric match result and interaction data, and the access data from a portable device. A remote server computer in communication with the resource provider computer verifies the cryptogram and the access data, and allows the interaction to proceed if the cryptogram and the access data are verified.

The resource provider computer 110 may operate a host site 110A. The host site 110A may be a website and may be accessible by a browser 214 on the user device 102. The host site 110A may be a location connected to the Internet that maintains one or more pages on the World Wide Web.

The transport computer 112 may be associated with the resource provider computer 110, and may manage authorization requests on behalf of the resource provider computer 110. In some embodiments of the invention, the transport computer 112 may be operated by an acquirer.

The processing computer 114 may be disposed between the transport computer 112 and the authorizing entity computer 116. The processing computer 114 may include data processing subsystems, networks, and operations used to support and deliver authorization services, exception file services, and clearing and settlement services. For example, the processing computer 114 may comprise a server coupled to a network interface (e.g., by an external communication interface), and databases of information. The processing computer 114 may be or be part of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing computer 114 may use any suitable wired or wireless network, including the Internet.

The authorizing entity computer 116 may typically be a system associated with an issuer or entity (e.g., a bank) that has a business relationship with a processing computer 114 or other entity.

Figure 2:
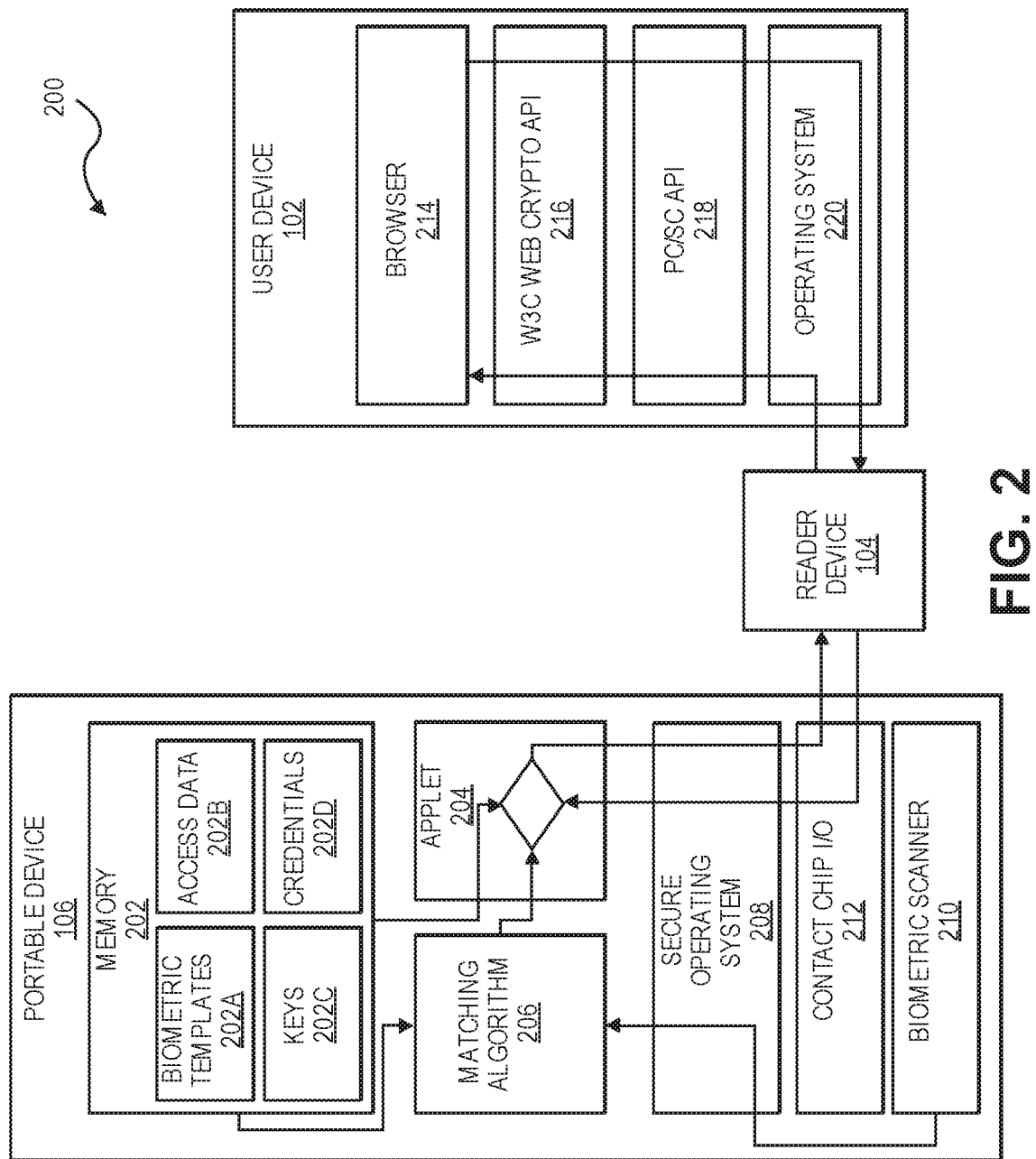
FIG. 2 shows a block diagram illustrating a portable device, a user device, and a reader device.

FIG. 2 shows a block diagram illustrating some system components in a subsystem 200 according to an embodiment of the invention. The subsystem 200 comprises a user device 102, a reader device 104, and a portable device 106, all operatively coupled together.

The user device 102 may include a browser 214, a w3c web crypto API 216 (World Wide Web Consortium cryptographic Application Program Interface), a PC/SC API 218 (Personal Computer/Smart Card Application Program Interface), and an operating system 220. It is noted that embodiments of the invention are not limited to the specific APIs mentioned, and that any suitable software interface may be used in embodiments of the invention.

The browser 214 may be any web browser capable of navigating the World Wide Web. The browser 214 may be able to operate on the operating system 220. Examples of suitable commercial browsers include Microsoft Explorer™, Google Chrome™, and Firefox™.

In some embodiments, the w3c web crypto API 216 may be a web cryptographic API defined by the w3c. It may be generically referred to as a cryptographic API. The w3c web crypto API 216 may contain a set of routines, protocols, and tools for cryptographic operations in web applications, such as encryption, decryption, hashing, and signature generation and verification. The w3c web crypto API 216 may be able to operate on the operating system 220.

The PC/SC API 218 may be any personal computer/smart card API used by or on a user device 102. The PC/SC API 218 may contain a set of routines, protocols, and tools allowing for a standard specification to ensure that the user device 102 operates with the reader device 104 and the portable device 106. The PC/SC API 218 may be able to operate on the operating system 220.

The operating system 220 may be any suitable operating system (OS) capable of running on the user device 102. The operating system 220 may be software capable of supporting functions, executing applications, and controlling peripherals on the user device 102. Suitable operating systems include Microsoft Windows™, Mac OS X™, and Linux™.

The user device 102 may also include components not listed above, such as a computer readable medium, a memory, a processor, a display, input elements, output elements, a network interface, and/or a device reader. Other details regarding exemplary user devices are provided above.

The portable device 106 may include a memory 202 which may store biometric templates 202A, access data 202B, keys 202D, and credentials 202D. The memory 202 may be a secure memory such as an HSM (hardware security module) or secure element. The portable device 106 may also comprise another memory (not shown) which may store an applet 204, a matching algorithm 206, a secure operating system 208. Alternatively, these elements may also on memory 202 rather than a different memory. The portable device 106 may also comprise a biometric scanner 210 and a contact chip I/O 212 (input/output). Other details regarding exemplary portable devices are provided above.

The memory 202 may be any suitable memory capable of storing data, information, and/or code. The memory 202 may store at least biometric templates 202A, access data 202B, keys 202C, and credentials 202D.

The applet 204 may aggregate the information on the portable device 106 as well as generate cryptograms with the keys 202C from the memory 202. For example, the applet 204 may collect a match result from a matching algorithm 206, an input from the reader device 104, as well as access data 202B, keys 202C and credentials 202D from the memory 202. The applet 204 may contain and/or execute any other suitable programs or applications to generate cryptograms and provide information to the user device 102. The applet 204 may be executed in conjunction with the secure operating system 208.

The matching algorithm 206 may be programmed to allow the portable device 106 to compare a first biometric template with a second biometric template stored on the portable device 106 and determine a match result. The matching algorithm may be executed in conjunction with the secure operating system 208.

The secure operating system 208 may be any suitable OS software capable of supporting functions, executing applications, and controlling peripherals on the portable device 106. The secure operating system 208 may execute an application capable of converting a biometric sample into a biometric template. In some embodiments, the matching algorithm 206 may convert the biometric sample into a biometric template, prior to evaluating a match.

The biometric scanner 210 may be any suitable scanner capable of capturing a biometric. The biometric scanner 210 outputs a biometric sample. Examples of the biometric scanner 210 include fingerprint readers, front-facing cameras, microphones, iris scanners, and the like.

The contact chip I/O 212 may allow inputs to the portable device 106 as well as outputs to other connected devices, such as the reader device 104 or the user device 102. In other embodiments, the contact chip I/O 212 can be a contactless chip I/O so the it may be generically referred to as I/O interface for the portable device.

The portable device 106 may also include components not listed above, such as a computer readable medium, a memory, a processor, a display, a long range antenna (e.g., if the portable device 106 is a phone), a network interface, and/or a device reader. Further details regarding exemplary portable devices are provided above.

Figure 3:
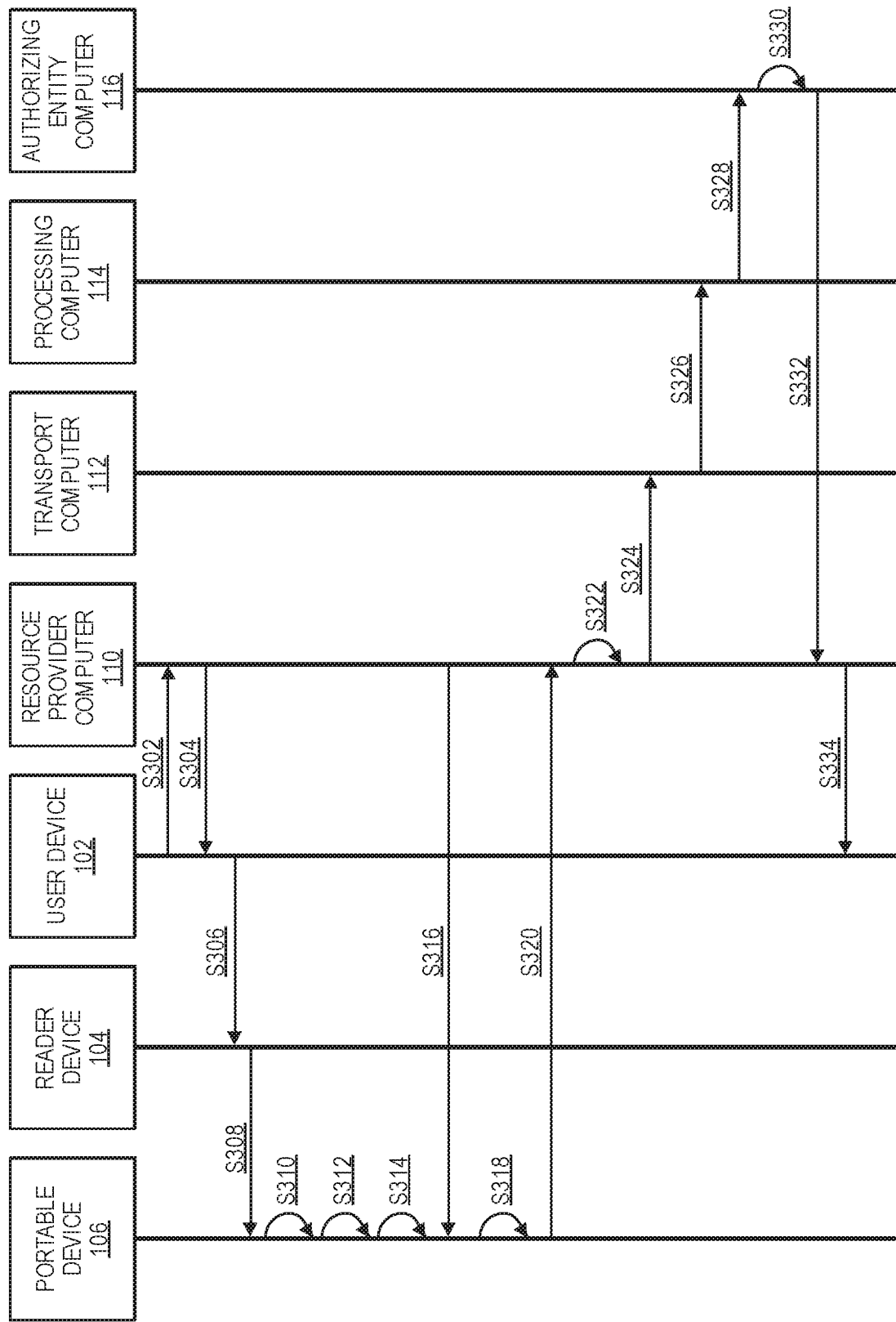
FIG. 3 shows a flow diagram illustrating a method according to an embodiment of the invention.

FIG. 3 shows a flow diagram of a method according to an embodiment of the invention. The method may be described in the context of a payment transaction. However, embodiments of the invention are not limited thereto.

At step S302, a first communication between the user device 102 and the resource provider computer 110 operating a host site in an interaction between the host site and a user of the user device 102 may be established. The user device 102 and the resource provider computer 110 may use the communications network 108 to establish the first communication. In some embodiments, the host site may be a merchant Website and the interaction may be a purchase transaction. The user of the user device 110 may select various items for purchase.

At some point during the interaction between the user device 102 and the resource provider computer 110, the user of the user device 102 may be asked to provide access data such as payment credentials to conclude the purchase transaction. At step S304, the resource provider computer 110 may provide a message (e.g., in the form of a checkout page) requesting that the user provide the required access data.

In embodiments of the invention, instead of the user entering in the access data (e.g., payment account information) onto a Web page of the host site 110A, the access data may be obtained from the portable device 106. The Web page or the browser on the user device 102 may prompt the user to interact his or her portable device (e.g., a card) with the reader device 104. For example, the Web page may ask the user to insert his or her portable device into the reader device 104. The reader device 104 may be in the user device 102 or may be coupled to the user device 102.

In step S306, to obtain the access data, the user device 102 communicate with the reader device 104, and in step S308, the reader device 104 may communicate with the portable device 105.

At step S310, the portable device 106 may capture a biometric sample of the user, using the biometric scanner 210 on the portable device 106. In some embodiments, the portable device 106 or the user device 102 may display a message on the user device 102. The displayed message may relay information asking the user to enter a biometric and may state "scan fingerprint on the portable device," "look at the camera on the device," or any other suitable statement that requests that the user enter his or her biometric into the portable device 106.

At step S312, after the portable device 106 has received the biometric data from the user, the portable device 106 may convert the biometric into a biometric sample, and then into the first biometric template.

At step S314, the portable device 106 may then compare the first biometric template with a second biometric template, using the matching algorithm 206. The second biometric template may be stored in the memory 202. The output of the matching algorithm 206 can produce a match result such as "match" or "no match." If the match result shows that the first biometric template and the second biometric template match, then the method may continue.

In embodiments of the invention, the matching algorithm 206 can be used to compare the data values of the first and second biometric templates and determine a confidence level that the first and second templates are from the same person. If the confidence level is above a predetermined threshold (e.g. above 95%), one may then conclude that the first and second biometric templates match and are from the same person. Methods for comparing biometric templates are known in the art. For example, further information regarding comparison and matching of biometrics such as facial samples can be found at:

Anil K. Jain, Stan Z. Li, Handbook of Face Recognition, Springer-Verlag New York, Inc., Secaucus, N.J., 2005.

In some embodiments, if the match result shows that the first biometric template and the second biometric template do not match, the portable device 106 may show or produce an "invalid" message or may prompt the user device 102 to display the "invalid" message. If the match result is negative, then the user may be prompted to try again. If the user fails the match process a predetermined number of times, the method may end.

At step S316, before or after the portable device 106 determines that a match is present, the resource provider computer 110 may transmit interaction data to the portable device 106, via the user device 102 and the reader device 104. In some embodiments, the portable device 106 may first transmit an interaction data request message to the resource provider computer 110 via the reader device 104 and the user device 102. The interaction data request message may request that the resource provider computer 110 transmit the interaction data to the portable device 106. The message sent from the resource provider computer 110 to the portable device 106 in step S316 may include interaction or transaction data including but not limited to the amount of the purchase, a resource provider identifier, and a timestamp for the interaction. Other interaction or transaction data may include a description of the items purchased. In other embodiments, the interaction or transaction data may have been transmitted in step S304, or before step S304.

At step S318, after receiving the interaction data and the positive match result, the applet 204 on the portable device 106 may generate a cryptogram by encrypting at least the interaction data and the match result, or a derivative thereof, with an encryption key. In other embodiments, a derivative of the interaction data and/or the match result may be encrypted instead of the actual interaction data and/or the match result. For example, in some embodiments, the interaction and/or the match result may be hashed (e.g., using a hashing algorithm) before it is encrypted. The portable device 106 may also encrypt the access data and credentials stored in the memory 202 of the portable device 106, along with the interaction data and the match result. In some embodiments, the encryption key may be an authorizing entity computer key (e.g., an issuer key). The encryption key may be a symmetric key, which may have been provisioned by the portable device 106 by an authorizing entity such as an issuer. The symmetric key(s) may be known to only the portable device 106, and the authorizing entity computer 116 and/or the processing computer 114. In other embodiments, the encryption key used to encrypt the interaction data and the match result may be a private key of a public/private key pair.

At step S320, the applet 204 on the portable device 106 may transmit the cryptogram and the access data to the browser 214 of the user device 102 via the reader device 104, and then to the resource provider computer 110.

In some embodiments, the cryptogram and the access data may be transmitted from the browser 214 located on the user device 102 to the host site 110A located on the resource provider computer 110.

At step S322, the resource provider computer 110 may generate an authorization request message comprising the access data (e.g., a primary account number or token) and the cryptogram. It may also include other data including the match or no match result, a matching confidence value, an indicator of the type of biometric verification performed, a transaction amount, a timestamp, etc. The authorization request message is then transmitted to the transport computer.

At step S324, after receiving the authorization request message, the resource provider computer 110 may transmit the authorization request message to the transport computer 112.

At step S326, after receiving the authorization request message, the transport computer 112 may transmit the authorization request message to the processing computer 114. The processing computer 114 may then validate the cryptogram, using a cryptographic key that corresponds to the cryptographic key that was used to encrypt the interaction data and the match result. The cryptographic key may be stored in a database along with the access data associated with that portable device 106, and an appropriate lookup can be performed for the cryptographic key. The lookup may be performed by using, for example, the access data such as a primary account number. Prior to manufacturing the portable device 106, the access data may have been stored in association with a first symmetric key on the portable device 106. The processing computer 114 may maintain a database with a second symmetric key corresponding to the first symmetric key in association with the access data. When the authorization request message is received by the processing computer 114, it may obtain the access data and then look up the corresponding second symmetric key.

In some embodiments, the corresponding cryptographic key may be symmetric key corresponding to the key that was used to encrypt the data. The processing computer 114 may verify the cryptogram by using a cryptographic key that corresponds to the key that was used to encrypt the data by the portable device 106. If the cryptogram is valid, then the processing computer 114 can be determine that the correct device verified the user's biometric. In some embodiments, the processing computer 114 may retrieve a corresponding symmetric key from a database and may decrypt the cryptogram to recover its inputs. The inputs may include previously encrypted transaction data (e.g., terminal ID, time, merchant, amount, etc.) and the match or no match indicator. The processing computer 114 may then match this data to the data that it received in the authorization request message. If it matches, then the cryptogram can be considered to be verified. In other embodiments, the processing computer 114 may retrieve a corresponding symmetric key from a database and may encrypt the received inputs in the authorization request message to form a second cryptogram. If the first and second cryptograms match, then the cryptogram can be considered validated.

In yet other embodiments, if the cryptogram was formed by encrypting a hash of the match or no match indicator, and/or the interaction data, then the processing computer 114 may hash the match or no match indicator, and/or the interaction data, and may verify that the hash matches a hash obtained from the cryptogram using the public key corresponding a private key used by the portable device to form the cryptogram.

At step S328, after receiving the authorization request message, the processing computer 114 may determine the appropriate authorizing entity computer 116, and may transmit the authorization request message to the authorizing entity computer 116. The authorization request message may be modified to include a verification indicator which indicates that the processing computer 114 validated the cryptogram and confirms that a successful biometric match occurred.

At step S330, after the authorizing entity computer 116 receives the authorization request message, the authorizing entity computer 116 may verify the cryptogram if the processing computer 114 did not do so previously. The same or different verification process can be performed by the authorizing entity computer 116 as described above for the authorizing entity computer 116. If a match result is present and the cryptogram is verified, then the authorizing entity computer 116 may further analyze the transaction to determine if there is any fraud associated with the transaction and/or if there is sufficient funds and/or credit in the user's account to conduct the transaction. After determining if the transaction is to be authorized, the authorizing entity computer 116 may then generate an authorization response message.

At step S332, the authorizing entity computer 116 may transmit an authorization response message to the resource provider computer 110 via the processing computer 114 and the transport computer 112.

At step S334, the resource provider computer 110 may transmit a notice to the user device 102 indicating whether or not the transaction was approved.

At the end of the day or at any other suitable period of time, a clearing and settlement process may occur between the transport computer 112, the processing computer 114, and the authorizing entity 116.

In some embodiments, the access data may comprise a payment token instead of a primary account number. If a payment token is used in the authorization request message, then the primary account number associated with the payment token may be substituted at the processing computer 114, before it is forwarded to the authorizing entity computer 116. The processing computer 114 may maintain a token vault which correlates payment tokens to their real primary account numbers. In addition, the authorization response message from the authorizing entity computer 116 may contain the real primary account number, and the processing computer 114 may replace the real payment account number with the payment token. The authorization response message with the payment token is then sent to the resource provider computer 110. This has advantages since the resource provider computer 110 does not retain sensitive information such as the real primary account number.

Figure 4:
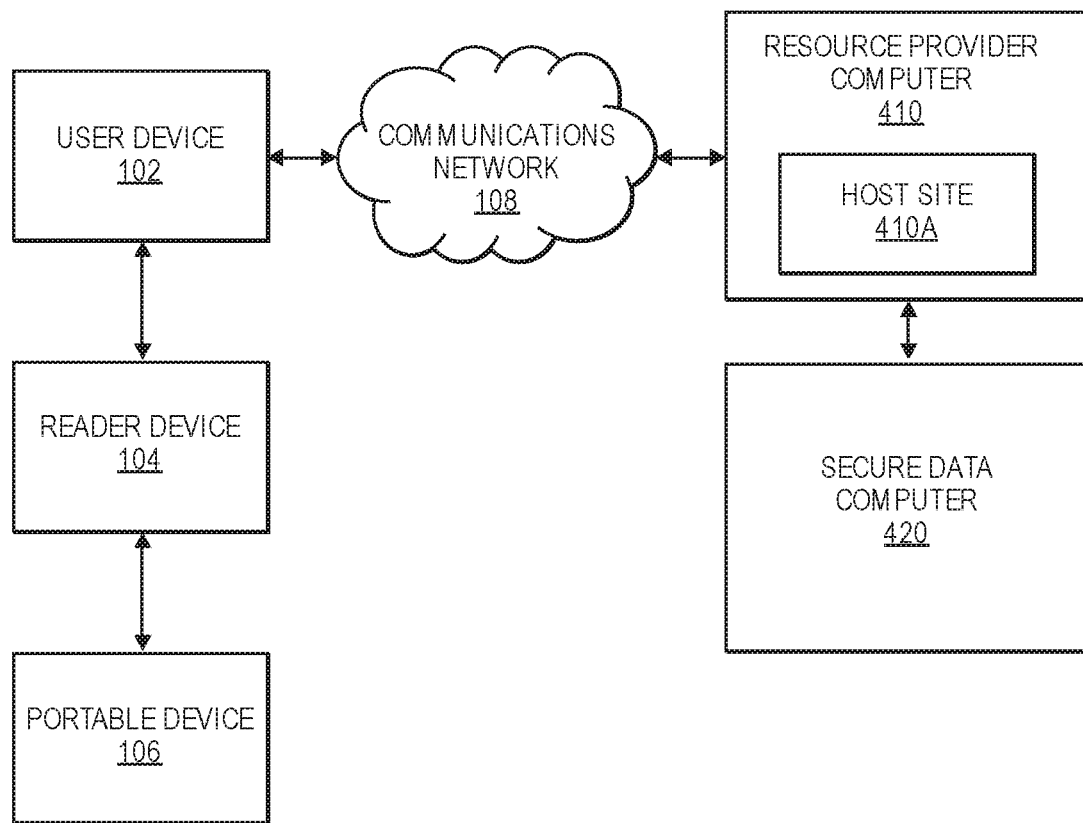
FIG. 4 shows a block diagram of another system according to an embodiment of the invention. The system illustrated in FIG. 4 can be used to access secure data.

FIG. 4 shows a block diagram illustrating a system according to another embodiment of the invention. The system can be for allowing a user to access a secure data computer 420, which holds secure data such as banking information, health information, personal identity information, etc. The secure data computer 420 can be accessed through a resource provider computer 410. The system 400 comprises a user device 102, a reader device 104, a portable device 106, and a communications network 108, all in operative communication. These components are described above, and the descriptions were incorporated herein. The user of the user device 102 may wish to access data on the secure data computer 420, but first needs to pass through the resource provider computer 410.

In a method for accessing secure data on the secure data computer 420, steps similar to steps S302-S320 may be performed. However, in this example, the access data may be an account number such as a medical record number. Also, instead of transaction data including a transaction amount, data such as the time at which the interaction with the authorizing entity computer 410 is occurring and the type of data requested (e.g., a current medical report) may be sent from the resource provider computer 410 to the user device 102.

After the resource provider computer 410 receives the access data and the cryptogram (e.g., comprising user and/or device credentials, and a match/no match indicator), and optionally the match/no match indicator, the secure data computer 420 may verify that that the access data is valid (e.g., by finding the user's account number), and may further verify that the cryptogram is valid with cryptographic key that was used to form the cryptogram. A validation process, similar to that described above with the method described with respect to FIG. 3 may be utilized.

Embodiments of the invention have a number of advantages. For example, since the comparison of biometric templates is being done on a portable device instead of at a remote server, the biometric verification process is fast and secure. Since the biometric templates are not stored at a remote server, there is no risk that any such biometric templates may be stolen as a result of a data breach at a biometric repository. Further, in some embodiments, since the access data on the portable device is tied to verification of a biometric sample corresponding to a biometric template on the portable device, the transmission and use of the access is secure. Further, since the user needs to be in possession of a physical portable device before an interaction can proceed, additional security is provided since it is difficult for a thief to impersonate the user without the portable device.

Embodiments of the invention have an additional number of advantages. In embodiments of the invention, a match result can be included in a cryptogram. This avoids the problem of a hacker using a previously compromised or stolen biometric template to trick the system into determining a match occurred between two biometric templates. Since the match result is included in the cryptogram along with current interaction data, and because the cryptogram was formed using a proper encryption key that is known only to certain entities, the verifying entity can be sure that the specific biometric verification process performed is tied to the specific interaction that is occurred and is not simply a replay of old data.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    establishing, a first communication between a user device and a resource provider computer operating a host site in an interaction between the host site and a user of the user device;
    after establishing the first communication, establishing, a second communication between the user device and a portable device of the user;
    capturing, by the portable device, a biometric sample of the user;
    converting, by the portable device, the biometric sample into a first biometric template;
    comparing, by the portable device, the first biometric template with a second biometric template stored on the portable device, and determining a match result;
    receiving, by the portable device from the resource provider computer, via the user device, interaction data comprising a transaction amount;
    generating, by the portable device, a cryptogram by encrypting at least the interaction data comprising the transaction amount, access data stored on the portable device, and the match result, or a derivative of the interaction data comprising the transaction amount, the access data, and the match result with an encryption key; and
    transmitting, by the portable device, the cryptogram and the access data stored on the portable device, to the resource provider computer via the user device, wherein the resource provider computer generates and transmits an authorization request message comprising the access data, the transaction amount and the cryptogram to a remote server computer, which verifies the cryptogram by decrypting the cryptogram to recover inputs to the cryptogram including the interaction data comprising the transaction amount and the match result, or the derivative of the interaction data comprising the transaction amount, the access data, and the match result, analyzes the match result or the derivative of the interaction data comprising the transaction amount, the access data, and the match result, verifies the cryptogram by comparing the interaction data comprising the transaction amount from the cryptogram to the interaction data comprising the transaction amount in the authorization request message, and by comparing the access data in the cryptogram to the access data in the authorization request message, and allows the interaction to continue using the access data based upon the verification of the cryptogram and the analysis of the match result.

2. The method of claim 1, wherein the encryption key is symmetric key.

3. The method of claim 1, wherein the portable device is in the form of a card.

4. The method of claim 1, wherein the derivative of the interaction data is a hash of the interaction data and wherein the method further comprises:
hashing the interaction data.

5. The method of claim 1, wherein the biometric sample is a fingerprint, a retinal scan, a facial scan, or a voice sample.

6. The method of claim 1, wherein the remote server computer is an authorizing entity computer configured to allow or deny access to secure data.

7. The method of claim 1, wherein the remote server computer is a processing computer.

8. The method of claim 1, further comprising, prior to receiving the interaction data:
transmitting, by the portable device to the remote server computer, a request for the interaction data.

9. A portable device capable of being coupled to a user device, the user device capable of establishing, a first communication between the user device and a resource provider computer operating a host site in an interaction between the host site and a user of the user device, comprising:
a processor;
a memory; and
a computer readable medium, the computer readable medium comprising code, executable by the processor, to implement a method comprising:
after establishing the first communication, establishing, a second communication between the user device and the portable device of the user;
capturing, a biometric sample of the user;
converting, the biometric sample into a first biometric template;
comparing, the first biometric template with a second biometric template stored on the portable device, and determining a match result;
receiving from the resource provider computer, via the user device, interaction data comprising a transaction amount;
generating, a cryptogram by encrypting at least the interaction data comprising the transaction amount, access data stored on the portable device, and the match result, or a derivative of the interaction data comprising the transaction amount, the access data stored on the portable device, and the match result, with an encryption key; and
transmitting, the cryptogram and the access data stored on the portable device, to the resource provider computer via the user device, wherein the resource provider computer generates and transmits an authorization request message comprising the access data, the transaction amount and the cryptogram to a remote server computer, which verifies the cryptogram by decrypting the cryptogram to recover inputs to the cryptogram including the interaction data and the match result, or the derivative of the interaction data and the match result, analyzes the match result or the derivative of the interaction data comprising the transaction amount, the access data, and the match result, verifies the cryptogram by comparing the interaction data comprising the transaction amount from the cryptogram to the interaction data comprising the transaction amount in the authorization request message, and by comparing the access data in the cryptogram to the access data in the authorization request message, and allows the interaction to proceed using the access data based upon the verification of the cryptogram and the analysis of the match result.

10. The portable device of claim 9, wherein the encryption key is a symmetric key.

11. The portable device of claim 9, wherein the portable device is in the form of a card.

12. The portable device of claim 9, wherein the portable device is in the form of a phone.

13. The portable device of claim 9, wherein the biometric sample is a fingerprint, a retinal scan, a facial scan, or a voice sample.

14. The portable device of claim 9, wherein the portable device comprises a reader device configured to read data from the portable device.

15. The portable device of claim 9, wherein the encryption key is stored in the memory and wherein the memory is a secure memory.

16. The portable device of claim 9, wherein the interaction data comprises a time stamp.

* * * * *